(12) United States Patent
Kroes

(10) Patent No.: US 10,234,053 B2
(45) Date of Patent: Mar. 19, 2019

(54) CONTROLLING FLUID FLOW

(71) Applicant: Calvin L. Kroes, Loveland, OK (US)

(72) Inventor: Calvin L. Kroes, Loveland, OK (US)

(73) Assignee: Texas Transland LLC, Wichita Falls, TX (US)

( * ) Notice: Subject to any disclaimer, the term of this patent is extended or adjusted under 35 U.S.C. 154(b) by 603 days.

(21) Appl. No.: 14/921,743

(22) Filed: Oct. 23, 2015

(65) Prior Publication Data
US 2017/0114922 A1   Apr. 27, 2017

(51) Int. Cl.
| F16K 31/00 | (2006.01) |
| F16K 31/126 | (2006.01) |
| F16K 7/17 | (2006.01) |
| A01M 7/00 | (2006.01) |
| B05B 1/30 | (2006.01) |
| B05B 12/08 | (2006.01) |
| F16K 27/02 | (2006.01) |
| B05B 1/16 | (2006.01) |
| B05B 13/00 | (2006.01) |

(52) U.S. Cl.
CPC ....... F16K 31/1262 (2013.01); A01M 7/0032 (2013.01); B05B 1/306 (2013.01); B05B 12/088 (2013.01); F16K 7/17 (2013.01); F16K 27/0236 (2013.01); B05B 1/1654 (2013.01); B05B 13/005 (2013.01)

(58) Field of Classification Search
CPC ........ F16K 31/1262; F16K 1/126; F16K 7/17; F16K 25/005; F16K 31/1268; A01C 23/047; A01M 7/0032; B05B 1/02; B05B 1/1654
USPC ........................................................ 239/392
See application file for complete search history.

(56) References Cited

U.S. PATENT DOCUMENTS

| 2004/0007686 A1* | 1/2004 | Kingsford | ............. F16K 41/103 251/335.3 |
| 2009/0272442 A1* | 11/2009 | Fishwick | ............ F15B 13/0405 137/487.5 |
| 2009/0283160 A1* | 11/2009 | Fishwick | ............ F15B 13/0405 137/596.14 |
| 2011/0260091 A1* | 10/2011 | Feldmeier | ............... F16K 11/20 251/331 |

* cited by examiner

*Primary Examiner* — Viet Le
(74) *Attorney, Agent, or Firm* — Baker Botts L.L.P.

(57) ABSTRACT

A system for controlling fluid flow includes a fluid inlet operable to receive a fluid flow, a fluid outlet operable to output the fluid flow, a diaphragm seat, a diaphragm operable to restrict the fluid flow between the fluid inlet and the fluid outlet by moving between an open position where the first diaphragm does not contact the diaphragm seat to a closed position where the diaphragm contacts the diaphragm seat, a spring operable to move the first diaphragm between the open position and the closed position, and a pressurized air inlet operable to receive pressurized air to move the first diaphragm between the open position and the closed position.

20 Claims, 1 Drawing Sheet

CONTROLLING FLUID FLOW

TECHNICAL FIELD

This disclosure relates generally to controlling fluid flow, and more particularly to controlling fluid flow in ground spraying delivery platforms.

BACKGROUND

Ground spraying delivery platforms (e.g., terrestrial and aircraft based) are utilized in agricultural industries to spray fluids (e.g., pesticides, herbicides, fertilizer, etc.) over farm land. Ground spraying delivery platforms often rely on pressurized air to control various components of the delivery platform. Pressurized air may be used to control a valve that regulates fluid flow from the delivery platform. However, in the absence of pressurized air, for example if the delivery platform is not in use, a valve regulating the fluid flow from the delivery platform may leak. Leaking fluids may include dangerous chemicals in concentrations that risk contaminating ground water and harming surrounding fauna and flora.

SUMMARY OF EXAMPLE EMBODIMENTS

According to embodiments of the present disclosure, disadvantages and problems associated with providing internal services to external enterprises may be reduced or eliminated.

In certain embodiments, a system for controlling fluid flow includes a fluid inlet operable to receive a fluid flow, a fluid outlet operable to output the fluid flow, a diaphragm seat, a diaphragm operable to restrict the fluid flow between the fluid inlet and the fluid outlet by moving between an open position where the first diaphragm does not contact the diaphragm seat to a closed position where the diaphragm contacts the diaphragm seat, a spring operable to move the first diaphragm between the open position and the closed position, and a pressurized air inlet operable to receive pressurized air to move the first diaphragm between the open position and the closed position.

Certain embodiments of the present disclosure may provide one or more technical advantages having specific technical effects.

In certain embodiments, a system includes one or more diaphragms that restrict fluid flow from a fluid inlet to a fluid outlet using a spring to overcome a fluid flow pressure when the system is inactive, and pressurized air to overcome a second flow pressure when the system is active, thereby preventing leaking of fluids that could compromise ground water or harm flora and fauna.

In particular embodiments, a system includes one or more diaphragms comprising chemical resistant materials that restrict fluid flow from a fluid inlet to a fluid outlet, thereby providing resistance to chemical degradation of the one or more diaphragms, which would cause leaking of fluids that could compromise ground water or harm flora and fauna.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
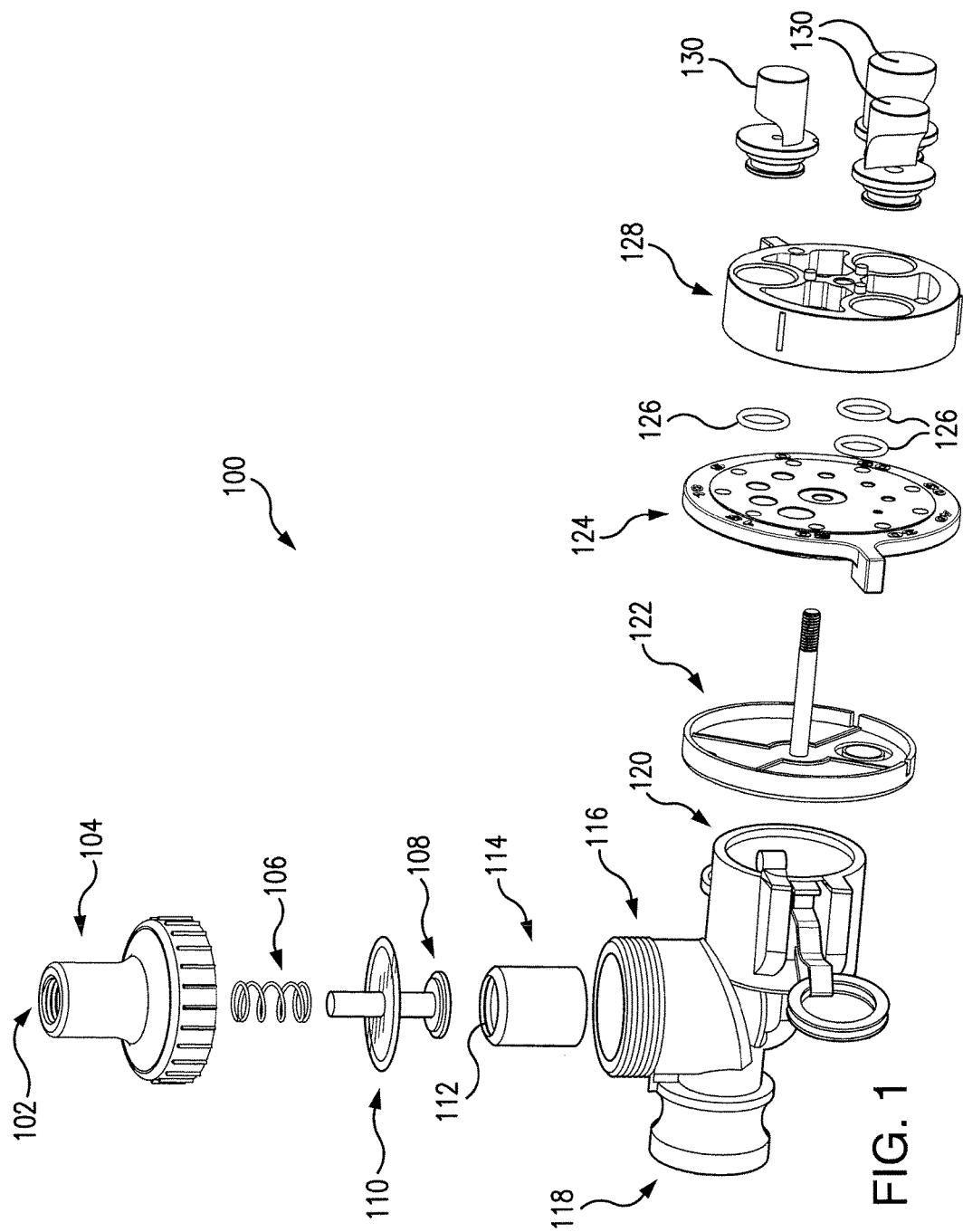
FIG. 1 illustrates an exploded diagram of an example system for controlling fluid flow.

Embodiments of the present disclosure and its advantages are best understood by referring to FIG. 1 of the drawings, like numerals being used for like and corresponding parts of the various drawings.

Ground spraying delivery platforms are often used in the agricultural industry to disburse fluids (e.g., pesticides, herbicides, fertilizer, etc.) over farmland. Ground spraying delivery platforms may be terrestrial (e.g., ground based) or aerial (e.g., aircraft based). Ground spraying delivery platforms include a fluid reservoir for storing fluids for disbursement. When the ground spraying delivery platform is active, the fluid may be pressurized (e.g., using a pump) to increase the fluid flow pressure and pressurized air may be used to operate a valve to prevent the pressurized fluid from leaking from the fluid reservoir. When the ground spraying delivery platform is inactive, the fluid may not be pressurized (e.g., pump disengaged) and pressurized air may not be available to operate the valve to prevent leakage of fluid from the reservoir. However, even when the ground spraying platform is inactive and the fluid unpressurized, there may still be fluid pressure due to the amount of fluid in the fluid reservoir, and without pressurized air to operate the valve, this fluid pressure may cause leaking. For example, even when unpressurized, the fluid may still have a residual fluid pressure resulting from the weight of the fluid (e.g., head pressure). This residual fluid pressure can be estimated based on the height of the fluid column at ½ PSI per foot.

In an embodiment, a system includes a combination pressurized air and spring valve. When a ground spraying platform is inactive and no pressurized air is supplied to the valve, the spring may supply sufficient force to engage the valve to overcome the inactive fluid pressure (e.g., from the amount of fluid in the reservoir) and prevent fluid leakage from the fluid reservoir. When the ground spraying platform is active, the fluid may be pressurized (e.g., using a pump) to levels that overcome the force of the spring, thereby allowing fluid to flow from the fluid reservoir. The fluid flow from the reservoir may be controlled by applying pressurized air to engage a valve to apply sufficient force to overcome the active fluid pressure.

FIG. 1 illustrates an example system 100 for controlling fluid flow. According to an embodiment, system 100 includes one or more of pressurized air inlet 102, valve body cap 104, valve compression spring 106, valve poppet 108, diaphragm 110, sealing ring 112, valve seat 114, valve body 116, fluid inlet 118, fluid outlet 120, orifice/nozzle housing 122, orifice selector 124, orifices 126, nozzle selector 128, and nozzles 130. In the illustrated embodiment, valve body cap 104 couples to valve body 116 (e.g., by screwing onto valve body 116) and valve compression spring 106, valve poppet 108, diaphragm 110, sealing ring 112, and diaphragm seat 114 are contained within valve body 116 and valve body cap 104.

When the valve is open, fluid flows through fluid inlet 118 and into valve body 116 around the outside of valve seat 114 and through the interior of valve seat 114 to pass out fluid outlet 120. When the valve is closed, valve poppet 108 depresses and contacts sealing ring 112 and diaphragm 110 contacts valve seat 114. If the fluid flow is not pressurized (e.g., from a pump), the force of spring 106 is sufficient to overcome the inactive fluid pressure (e.g., from the height of the fluid column) of the fluid flow and depress valve poppet 108 to contact sealing ring 112 and diaphragm 110 to contact valve seat 114. If the fluid flow is pressurized (e.g., from a pump), the pressurized fluid flow is sufficient to overcome the force from spring 106 and the fluid flow will press diaphragm 110 and poppet 108 off of valve seat 114 and break the seal opening the valve. When the fluid flow is pressurized and overcomes the force of spring 106, the valve may be closed by providing air pressure through pressurized air inlet 102 to overcome the pressurized fluid flow and depress poppet 108 onto sealing ring 112 and diaphragm 110 onto valve seat 114, thereby creating a seal and stopping the pressurized fluid flow. When the system is active and the fluid flow is pressurized, the fluid flow may be controlled by adjusting the applied air pressure to regulate the rate of the fluid flow through valve seat 114 and out fluid outlet 120.

Pressurized air inlet 102 represents an opening in valve body cap 104 operable to receive pressurized air. In certain embodiments, pressurized air inlet 102 is operable to couple to a pressurized air supply of a ground spraying delivery platform through a port (e.g., ¼" National Pipe Thread (NPT)). Pressurized air inlet 102 may be able to receive pressurized air at pressures ranging from (e.g., 60-120 PSI). Valve body cap 104 represents a detachable (e.g., via screw threads) cap to valve body 116. Valve body cap 104 may allow access to one or more of valve compression spring 106, poppet 108, diaphragm 110, sealing ring 112, and valve seat 114, for example, for cleaning, maintenance, or replacement. Valve body cap 104 may include pressurized air inlet 102.

Valve compression spring 106 represents a spring operable to apply a force to valve poppet 108 to depress diaphragm 110 and into contact with valve seat 114. Valve poppet 108 may contact sealing ring 112 and diaphragm 110 may contact valve seat 114 to create a seal. Valve compression spring 106 may be calibrated such that it applies sufficient force to overcome the inactive (e.g., unpressurized) fluid flow pressure (e.g., 15 PSI or lower) from a fluid reservoir of a ground spraying delivery platform, but does not apply sufficient force to overcome the active (e.g., pressurized) fluid flow pressure (e.g., 20-40 PSI) from a fluid reservoir of a ground spraying delivery platform. Accordingly, when a ground spraying delivery platform is inactive (e.g., unpressurized), valve compression spring 106 may prevent leaking from the fluid reservoir and when the ground spraying delivery platform is active (e.g., pressurized), valve compression spring 106 may yield and allow fluid to flow from the fluid reservoir through fluid inlet 118, through valve housing 116 around the exterior of valve seat 114 and then down the interior of valve seat 114 and out fluid outlet 120. When the ground spraying delivery platform is active (e.g., pressurized), pressurized air may be supplied (e.g., through pressurized air inlet 102) to supplement the force of valve compression spring 106 and overcome the active fluid pressure (e.g., 20-40 PSI) to control the flow of fluid from the fluid reservoir through fluid inlet 118, through valve seat 114, and out fluid outlet 120.

Valve poppet 108 represents a structure engaged by valve compression spring 106 to contact sealing ring 112 and to move diaphragm 110 to contact valve seat 114 to form a seal to stop fluid flow through the interior of valve seat 114. Valve poppet 108 may be engaged by valve compression spring 106 and/or pressurized air from pressurized air inlet 102 to engage diaphragm 110. In certain embodiments, valve poppet 108 is operable to move between a closed position, where valve poppet 108 and diaphragm 110 contact valve seat 114 and stop the flow of fluid from fluid inlet 118 to fluid outlet 120, and one or more open positions, where valve poppet 108 and diaphragm 110 do not contact valve seat 114 and fluid is allowed to flow from fluid inlet 118 through the interior of valve seat 114 to fluid outlet 120. Accordingly, valve poppet 108 may allow for variable fluid flow control from fluid inlet 118 to fluid outlet 120 based on the position of valve poppet 108.

Diaphragm 110 represents a structure operable to form a seal with valve seat 114 to stop a fluid flow from fluid inlet 118 to fluid outlet 120. In certain embodiments, only a multiple diaphragms 110 may be employed and. Diaphragm 110 may be comprised of any suitable material, including synthetic rubber, such as Viton™, and synthetic fluoropolymer, such as Teflon™, however, diaphragm 110 may be comprised of any suitable material. Materials may be selected based on strength, chemical resistance, sealing effectiveness, or any other suitable characteristic. Diaphragm 110 may be engaged by poppet 108 to restrict and/or stop a fluid flow between fluid inlet 118 and fluid outlet 120. In certain embodiments, multiple diaphragms 110 may be deployed and may be comprised of different materials.

Valve seat 114 represents a structure that may be contacted by one or more of valve poppet 108 and diaphragm 110 to stop the flow of fluid from fluid inlet 118 to fluid outlet 120. For example, valve seat 114 may include sealing ring 112 (e.g., an "O" ring) and valve poppet 108 may be operable to contact sealing ring 112 inside valve seat 114 to form a seal to stop the fluid flow through valve seat 114. Diaphragm 110 may contact the top of valve seat 114 to form a seal to stop the fluid flow through valve seat 114. In certain embodiments, valve seat 114 is hollow and provides a channel for fluid from fluid inlet 118 to pass to fluid outlet 120. However, when contacted by one or more of diaphragm 110 and diaphragm 112, the channel is cut off and the fluid flow from fluid inlet 118 to fluid outlet 120 is stopped.

Valve body 116 represents a structure operable to channel fluid received at fluid inlet 118 of valve body 116 to fluid outlet 120 of valve body 120. Fluid inlet 118 represents an opening in valve body 116 operable to receive a fluid flow, for example, from a fluid reservoir of a ground spraying delivery platform. Fluid outlet 120 represents an opening in valve body 116 operable to outlet a fluid flow received at fluid inlet 118. In certain embodiments, valve body 116 includes a detachable valve body cap 104. Valve body 116 may house one or more of valve compression spring 106, valve poppet 108, diaphragm 110, diaphragm 112, and valve seat 114. In certain embodiments, valve body 116 may detachably couple to one or more of orifice/nozzle housing 122, orifice selector 124, orifices 126, nozzle selector 128, and nozzles 130. In particular embodiments, valve body 116 may include and/or house one or more of orifice/nozzle housing 122, orifice selector 124, orifices 126, nozzle selector 128, and nozzles 130.

Orifice/nozzle connector 122 represents a structure operable to connect one or more of orifice selector 124, orifices 126, nozzle selector 128, and nozzles 130 to valve housing 116 (e.g., at fluid outlet 120). In certain embodiments, orifice/nozzle connector 122 may detachably couple to valve body 116 (e.g., at fluid output 120). Orifice selector 124 represents a structure comprising a plurality of orifices 126 and operable to align a selected one of the plurality of orifices 126 with a fluid flow from fluid outlet 120. In the illustrated embodiment, orifice selector 124 is a wheel that rotates a selected one of a plurality of orifices 126 to align with fluid outlet 120. Orifices 126 represent openings operable to restrict a fluid flow from fluid outlet 120. The size and shape of an orifice 126 may determine the volumetric fluid flow rate, fluid flow pressure, and/or fluid flow speed a fluid flow through orifice 126.

Nozzle selector 128 represents a structure comprising a plurality of nozzles 130 and operable to align a selected one of the plurality of nozzles 130 with a fluid flow from fluid outlet 120 and/or orifice 126. In the illustrated embodiment, nozzle selector 128 is a wheel that rotates a selected one of a plurality of nozzles 130 to align with fluid outlet 120 and/or orifice 126. Nozzles 130 represent structures operable to shape a disbursement pattern of a fluid flow output from nozzles 130. The size and shape of nozzle 130 may determine the disbursement pattern of a fluid flow output from nozzles 130. Different disbursement patterns may be beneficial for different applications (e.g., herbicide, pesticide, fertilizer, etc.) and conditions (e.g., wind, rain, terrain, etc.)

In certain embodiments, system 100 may be utilized as part of a ground spraying delivery platform (e.g., aircraft based platforms such as Air Tractor or Thrush platforms or ground based platforms such as floaters, pull-type sprayers, and row-crop). These platforms are often used in agriculture to disburse liquids (e.g., pesticides, herbicides, fertilizer, etc.) over farmland. System 100 may connect to a fluid reservoir at fluid inlet 118 and may connect to a pressurized air supply at pressurized air inlet 102. In certain embodiments, the fluid reservoir is pressurized when the ground spraying delivery platform is active (e.g., to between 20-60 PSI), and is not pressurized when the ground spraying delivery platform is inactive.

When the ground spraying platform is inactive and the fluid flow is not pressurized, the fluid pressure at fluid inlet 118 may be due primarily to the amount of fluid in the fluid reservoir. In certain embodiments, the inactive fluid pressure is at or below 15 PSI. However, when the ground spraying platform is inactive, there may be no pressurized air supplied through pressurized air inlet 102 to depress poppet 108 and diaphragm 110 into contact with valve seat 114 to stop the flow of fluid from fluid inlet 118 to fluid outlet 120. In traditional systems, when pressurized air is not supplied, the inactive fluid pressure from the fluid reservoir may cause leaks. Fluids used in ground spraying delivery platforms (e.g., pesticide, herbicide, fertilizer, etc.) may comprise chemical concentrations that would endanger ground water supplies and/or surrounding flora and fauna. Further, the leaked fluid represents wasted product. In system 100, spring 106 may supply sufficient force to overcome the inactive fluid pressure and depress valve poppet 108 and diaphragm 110 to contact valve seat 114, thereby stopping the flow of fluid from fluid inlet 118 to fluid outlet 120 and preventing leaks.

When the ground spraying platform is active, the fluid reservoir may be pressurized to levels (e.g., 20-40 PSI) to overcome the force of spring 106, thereby allowing fluid to flow from the fluid reservoir to fluid inlet 118 and out fluid outlet 120. When active, the fluid flow may be controlled applying pressurized air through pressurized air inlet 102 to apply sufficient force to overcome the active fluid pressure (e.g., 20-40 PSI) and depress poppet 108 and diaphragm 110 towards with valve seat 114, and the fluid flow may be stopped by applying pressurized air through pressurized air inlet 102 to apply sufficient force to overcome the active fluid pressure and depress poppet 108 and diaphragm 110 into contact with valve seat 114 and stopping the fluid flow from fluid inlet 118 to fluid outlet 120.

In certain embodiments, system 100 includes multiple diaphragms 110. Diaphragm 110 may be comprised of different materials. In an embodiment, diaphragm 110 is comprised of a synthetic rubber, such as Viton™ and/or a synthetic fluoropolymer, such as Teflon™. Materials for diaphragm 110 may provide resistance to chemicals, such as those used in ground spraying platforms (e.g., herbicide, pesticide, fertilizer, etc.) and/or may provide a sufficient seal against valve body 116 and/or diaphragm seat 114 to stop the flow of fluid between fluid inlet 118 and fluid outlet 120 at one or more of active fluid pressures (e.g., 20-40 PSI) and inactive fluid pressures (e.g., 15 PSI or lower).

In certain embodiments, system 100 includes one or more of orifice/nozzle housing 122, orifice selector 124, one or more orifices 126, nozzle selector 128, and one or more nozzles 130. System 100 may include one orifice 126 and one nozzle 130, multiple selectable orifices 126 (e.g., on orifice selector 124) and one nozzle 130, one orifice 126 and multiple selectable nozzles 130 (e.g., on nozzle selector 128), or multiple selectable orifices 126 (e.g., on orifice selector 124) and multiple selectable nozzles 130 (e.g., on nozzle selector 128). In an embodiment, one or more of orifice selector 124, one or more orifices 126, nozzle selector 128, and one or more nozzles 130 are contained within orifice/nozzle housing 122.

One of the one or more orifices 126 may couple to fluid outlet 120 and restrict the fluid flow out of fluid outlet 120, for example, based on the size and shape of the one of the one or more orifices 126. In particular embodiments, one of the one or more nozzles 130 receives the fluid flow from the one of the one or more orifices 126 and shapes the fluid flow into a disbursal pattern, for example, based on the size and shape of the one of the one or more nozzles 130. Orifices 126 and/or nozzles 130 may be selectable. For example, a plurality of orifices 126 may be on orifice selector 124 and/or a plurality of nozzles 130 may be on a nozzle selector 128. In certain embodiments, orifice selector 124 and nozzle selector 128 are rotating wheels that align the selected orifice 126 with fluid outlet 120 and/or align the selected nozzle 130 with the selected orifice 126 such that fluid from fluid outlet 120 can pass through the selected orifice 126 and/or the selected nozzle 130. In certain embodiments, one or more of orifice/nozzle housing 122, orifice selector 124, orifice(s) 126, nozzle selector 128, and/or nozzles 130 may be detachable.

Modifications, additions, or omissions may be made to system 100. System 100 may include more, fewer, or other components. The components of system 100 may comprise an apparatus for controlling fluid flow.

Certain embodiments of the present disclosure may provide one or more technical advantages having specific technical effects.

In certain embodiments, a system includes one or more diaphragms that restrict fluid flow from a fluid inlet to a fluid outlet using a spring to overcome a fluid flow pressure when the system is inactive and pressurized air to overcome a second flow pressure when the system is active, thereby preventing leaking of fluids that could compromise ground water or harm flora and fauna.

In particular embodiments, a system includes one or more diaphragms comprising chemical resistant materials that restrict fluid flow from a fluid inlet to a fluid outlet, thereby providing resistance to chemical degradation of the one or more diaphragms, which would cause leaking of fluids that could compromise ground water or harm flora and fauna.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. An apparatus for controlling fluid flow, comprising:
a fluid inlet operable to receive a fluid flow;
a fluid outlet operable to output the fluid flow;
a diaphragm seat comprising a sealing ring on an interior surface of the diaphragm seat, the diaphragm seat positioned between the fluid inlet and fluid outlet in the path of the fluid flow;
a valve poppet coupled to a diaphragm, the valve poppet operable to control the fluid flow between the fluid inlet and the fluid outlet by moving between a closed position where the diaphragm contacts the diaphragm seat forming a first seal and the valve poppet contacts the sealing ring of the valve seat forming a second seal, and one or more open positions where the diaphragm is retracted from the diaphragm seat and the valve poppet is retracted from the sealing ring of the diaphragm seat, the fluid flow stopped by the first seal between the diaphragm and the diaphragm seat and the second seal between the valve poppet and the sealing ring in the closed position, and the fluid flow variably restricted by a first separation between the diaphragm and the diaphragm seat and a second separation between the valve poppet and the sealing ring in the one or more open positions;
a spring coupled to the valve poppet and operable to move the valve poppet and diaphragm between the closed position and the one or more open positions and to maintain the diaphragm and valve poppet in the closed position up to a first fluid flow pressure threshold; and
a pressurized air inlet operable to receive pressurized air to variably move the diaphragm and valve poppet between the closed position and the one or more open positions and to maintain the diaphragm and valve poppet in the closed position up to a second fluid flow pressure threshold, the second fluid flow pressure greater than the first fluid flow pressure threshold.

2. The apparatus of claim 1, the pressurized air inlet operable to receive pressurized air operable to vary the pressure level of the pressurized air to move the diaphragm and valve poppet between closed position and the one or more open positions to control the fluid flow released from the fluid outlet when the fluid flow pressure is greater than the first threshold.

3. An apparatus for controlling fluid flow, comprising:
a fluid inlet operable to receive a fluid flow;
a fluid outlet operable to output the fluid flow;
a diaphragm seat comprising a sealing ring on an interior surface of the diaphragm seat, the diaphragm seat positioned between the fluid inlet and fluid outlet in the path of the fluid flow;
a valve poppet coupled to a first diaphragm, the valve poppet operable to restrict the fluid flow between the fluid inlet and the fluid outlet by moving between a closed position where the first diaphragm contacts the diaphragm seat forming a first seal and the valve poppet contacts the sealing ring of the valve seat forming a second seal, and one or more open positions where the diaphragm is retracted from the diaphragm seat and the valve poppet is retracted from the sealing ring of the diaphragm seat, the fluid flow stopped by the first seal between the first diaphragm and the diaphragm seat and the second seal between the valve poppet and the sealing ring in the closed position;
a spring coupled to the valve poppet and operable to move the valve poppet and the first diaphragm between the open position and the closed position and to maintain the diaphragm and valve poppet in the closed position up to a first fluid flow pressure threshold; and
a pressurized air inlet operable to receive pressurized air to move the valve poppet and the first diaphragm between the open position and the closed position.

4. The apparatus of claim 3, the pressurized air inlet operable to receive pressurized air operable to vary the pressure level of the pressurized air to move the valve poppet and the first diaphragm between the closed position and the one or more open positions to control the fluid flow released from the fluid outlet.

5. The apparatus of claim 3,
the pressurized air inlet operable to receive pressurized air to maintain the valve poppet and the first diaphragm in the closed position up to a second fluid flow pressure threshold, the second fluid flow pressure greater than the first fluid flow pressure threshold.

6. The apparatus of claim 3, the valve poppet and the first diaphragm operable to restrict the fluid flow between the fluid inlet and the fluid outlet by moving between the closed position and the one or more open positons where the first diaphragm is retracted from the diaphragm seat and the valve poppet is retracted from the sealing ring, the fluid flow stopped by the first seal between the first diaphragm and the diaphragm seat and the second seal between the valve poppet and the sealing ring in the closed position, and the fluid flow variably restricted by a first separation between the first diaphragm and the diaphragm seat and a second separation between the valve poppet and the sealing ring in the one or more open positions.

7. The apparatus of claim 3, further comprising a second diaphragm, where in the first diaphragm comprises a first material and the second diaphragm comprises a second material.

8. The apparatus of claim 3, wherein the valve poppet is configured to fit within the diaphragm seat and contact the sealing ring.

9. The apparatus of claim 3, further comprising:
one or more orifices operable to receive and restrict the fluid flow from the fluid outlet; and
one or more nozzles operable to receive the fluid flow from one of the one or more orifices and to disburse the fluid flow in a pattern.

10. The apparatus of claim 9, wherein one of the one or more orifices is selectable to receive and restrict the fluid flow from the fluid outlet and one of the one or more nozzles is selectable to receive the fluid flow from the selected orifice and to disburse the fluid flow in a pattern associated with the selected nozzle.

11. The apparatus of claim 9, wherein the one or more orifices and the one or more nozzles are detachable from the fluid outlet.

12. A system for controlling fluid flow, comprising:
a fluid inlet operable to receive a fluid flow;
a fluid outlet operable to output the fluid flow;
a diaphragm seat comprising a sealing ring on an interior surface of the diaphragm seat, the diaphragm seat positioned between the fluid inlet and fluid outlet in the path of the fluid flow;
a valve poppet coupled to a first diaphragm, the valve poppet operable to restrict the fluid flow between the fluid inlet and the fluid outlet by moving between a closed position where the first diaphragm contacts the diaphragm seat forming a first seal and the valve poppet contacts the sealing ring of the valve seat forming a second seal, and one or more open positions where the diaphragm is retracted from the diaphragm seat and the valve poppet is retracted from the sealing ring of the diaphragm seat, the fluid flow stopped by the first seal between the first diaphragm and the diaphragm seat and the second seal between the valve poppet and the sealing ring in the closed position;

a spring coupled to the valve poppet and operable to move the valve poppet and the first diaphragm between the open position and the closed position and to maintain the diaphragm and valve poppet in the closed position up to a first fluid flow pressure threshold; and a pressurized air inlet operable to receive pressurized air to move the valve poppet and the first diaphragm between the open position and the closed position.

13. The system of claim 12, the pressurized air inlet operable to receive pressurized air operable to vary the pressure level of the pressurized air to move the valve poppet and the first diaphragm between the open position and the closed position to control the fluid flow released from the fluid outlet.

14. The system of claim 12,
the pressurized air inlet operable to receive pressurized air to maintain the valve poppet and the first diaphragm in the closed position up to a second fluid flow pressure threshold, the second fluid flow pressure greater than the first fluid flow pressure threshold.

15. The system of claim 12, the valve poppet and the first diaphragm operable to restrict the fluid flow between the fluid inlet and the fluid outlet by moving between the closed position and the one or more open positions where the first diaphragm is retracted from the diaphragm seat and the valve poppet is retracted from the sealing ring, the fluid flow stopped by the first seal between the first diaphragm and the diaphragm seat and the second seal between the valve poppet and the sealing ring in the closed position, and the fluid flow variably restricted by a first separation between the first diaphragm and the diaphragm seat and a second separation between the valve poppet and the sealing ring in the one or more open positions.

16. The system of claim 12, further comprising a second diaphragm, where in the first diaphragm comprises a first material and the second diaphragm comprises a second material.

17. The system of claim 12, wherein the the valve poppet is configured to fit within the diaphragm seat and contact the sealing ring.

18. The system of claim 12, further comprising:
one or more orifices operable to receive and restrict the fluid flow from the fluid outlet; and
one or more nozzles operable to receive the fluid flow from one of the one or more orifices and to disburse the fluid flow in a pattern.

19. The system of claim 18, wherein one of the one or more orifices is selectable to receive and restrict the fluid flow from the fluid outlet and one of the one or more nozzles is selectable to receive the fluid flow from the selected orifice and to disburse the fluid flow in a pattern associated with the selected nozzle.

20. The system of claim 18, wherein the one or more orifices and the one or more nozzles are detachable from the fluid outlet.

* * * * *